US012489715B1

United States Patent
Ben-Ezra et al.

(10) Patent No.: US 12,489,715 B1
(45) Date of Patent: Dec. 2, 2025

(54) VARIABLE BUFFER SIZE IN COMMUNICATION NETWORKS

(71) Applicant: NEWPHOTONICS LTD., Kfar Mordeachi (IL)

(72) Inventors: Yosef Ben-Ezra, Petah Tikva (IL); Yaniv Ben-Haim, Kfar-Mordehai (IL)

(73) Assignee: NEWPHOTONICS LTD., Kfar Mordechai (IL)

( * ) Notice: Subject to any disclaimer, the term of this patent is extended or adjusted under 35 U.S.C. 154(b) by 0 days.

(21) Appl. No.: 18/789,190

(22) Filed: Jul. 30, 2024

(51) Int. Cl.
*H04L 47/625* (2022.01)
*H04L 47/6275* (2022.01)
*H04L 47/83* (2022.01)

(52) U.S. Cl.
CPC ...... *H04L 47/6255* (2013.01); *H04L 47/6275* (2013.01); *H04L 47/83* (2022.05)

(58) Field of Classification Search
None
See application file for complete search history.

(56) References Cited

U.S. PATENT DOCUMENTS

| | | | |
|---|---|---|---|
| 2019/0036788 A1* | 1/2019 | Gupta | H04L 41/147 |
| 2020/0167258 A1 | 5/2020 | Chattopadhyay et al. | |
| 2022/0014963 A1* | 1/2022 | Yeh | G06N 7/01 |
| 2022/0247643 A1* | 8/2022 | Dechene | H04L 45/64 |
| 2022/0261661 A1* | 8/2022 | Khaligh | G06Q 10/0631 |
| 2023/0224752 A1* | 7/2023 | Huang | H04W 24/10 |
| | | | 370/252 |

FOREIGN PATENT DOCUMENTS

| | | |
|---|---|---|
| WO | 2022/162477 A1 | 8/2022 |
| WO | 2022/168074 A1 | 8/2022 |
| WO | 2022/208271 A1 | 10/2022 |
| WO | 2022/238998 A1 | 11/2022 |

OTHER PUBLICATIONS

Zhu, Keke, et al. "Differentiated transmission based on traffic classification with deep learning in datacenter", In: 2020 IFIP Networking Conference (Networking), IEEE, 2020; p. 599-603.
6. Majidi, Akbar, et al. "DC-ECN: A machine-learning based dynamic threshold control scheme for ECN marking in DCN", Computer Communications, 2020, 150: 334-345.
ISR & WO, PCT/IL2022/050482 (Aug. 8, 2022).

* cited by examiner

*Primary Examiner* — June Sison

(57) ABSTRACT

A method for managing traffic in a communication network and computer program product, the method comprising: receiving plurality of traffic units to be transmitted by a switch through a port having an associated queue; extracting features from the traffic units; providing the features to a first engine, to obtain a class for the traffic units; using a second engine associated with a traffic model for the class, obtaining an indication of a predicted traffic volume for the class for a future time and for the physical location of a switch that transmits the plurality of traffic units; allocating a queue of a size corresponding to the indication; assigning the plurality of traffic units to the buffer; determining whether performance of the communication network has improved or deteriorated; and subject to deterioration of the performance: generating a penalty; and retraining the first engine or the second engine in accordance with the penalty.

20 Claims, 8 Drawing Sheets

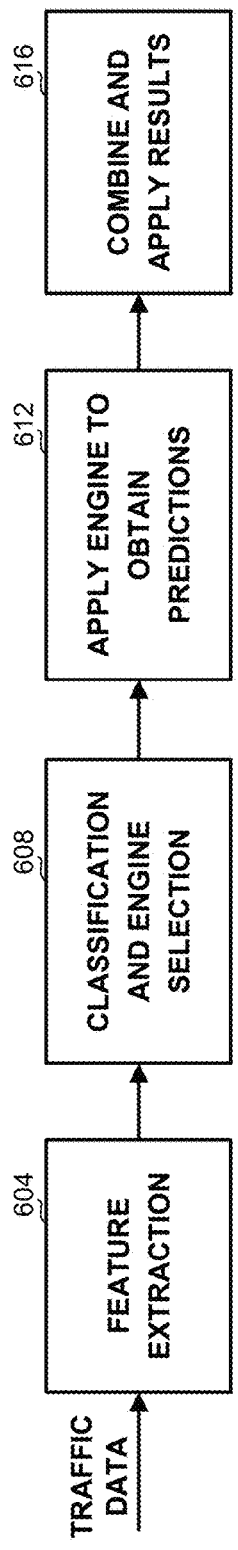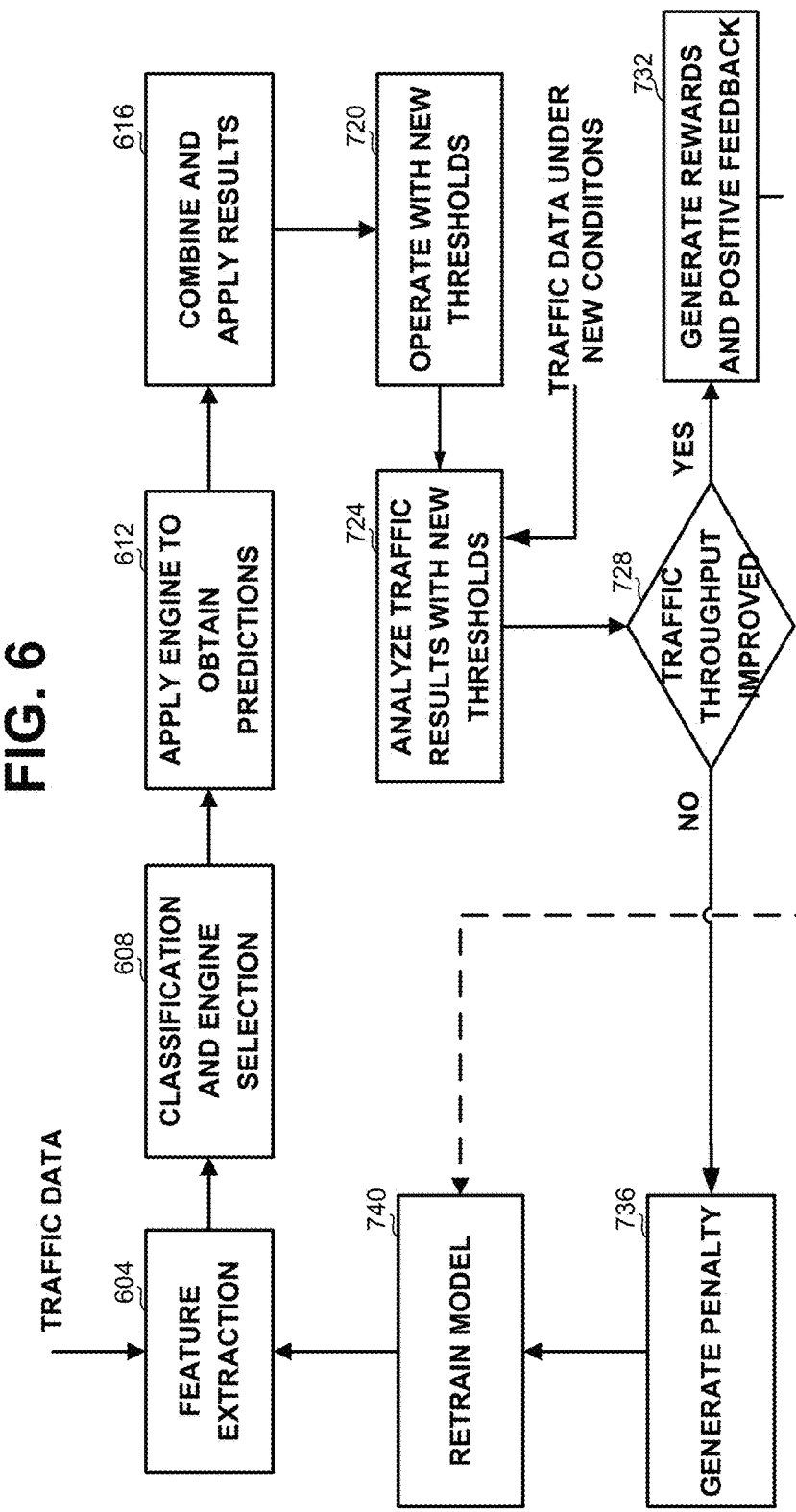

VARIABLE BUFFER SIZE IN COMMUNICATION NETWORKS

TECHNICAL FIELD

The present disclosure relates to managing buffer sizes in communication networks.

BACKGROUND

Data centers are used to process the workloads created by the ever-growing plethora of available applications, due to the also growing number of end users, and the whole data transition in the cloud. The challenge in designing the data center networking plays a major role in the performance of the various cloud applications. The data center operators face extreme challenges in utilizing the available bandwidth for the plurality of applications of various types, each having its own requirements, such as different throughputs which may also vary over time, quality of service (QoS) requirements, acceptable latency, or the like.

Generally, if the communication channel or the transmission receiving end are loaded to their full capacity, traffic units such as packets may be stored in a buffer until the channel or destination can accommodate and handle them, whether before being transmitted or after being received. However, when the buffer is full, packets may get lost, which may result in a severe problem.

SUMMARY

One exemplary embodiment of the disclosed subject matter is a method for managing traffic in a communication network, comprising: receiving plurality of traffic units to be transmitted by a switch through a port, the port having an associated queue; extracting features from the plurality of traffic units; providing the features to a first engine, to obtain a class for the plurality of traffic units; using a second engine associated with a traffic model for the class, obtaining an indication of a predicted traffic volume for the class for a future time and for the physical location of a switch that transmits the plurality of traffic units; allocating a queue of a size corresponding to the indication of the predicted traffic volume; assigning the plurality of traffic units to the buffer; determining whether performance of the communication network has improved or deteriorated; and subject to deterioration of the performance: generating a penalty; and retraining the first engine or the second engine in accordance with the penalty. The method can further comprise generating a reward subject to improvement of the performance, wherein retraining the first engine or the second engine is optionally performed also accordance with the reward. Within the method, whether the performance of the communication network has improved or deteriorated is optionally based one or more items selected from the group consisting of: throughput, whether congestions occurred, number of high priority packets lost, total number of lost packets, and transition duration of the between the previous state with the previous thresholds and the new state with updated threshold. Within the method, the traffic unit is optionally a packet. The method can further comprise: receiving a preliminary plurality of traffic units to be transmitted; extracting features from each of the preliminary plurality of traffic units to obtain a plurality of feature vectors; clustering the plurality of feature vectors into a plurality of classes; and training the first engine to receive the plurality of traffic units and output the class from the plurality of classes. The method can further comprise: training the second engine upon a subset of the plurality of feature vectors assigned to a specific class, such that the second engine is adapted to provide the indication for the predicted traffic volume for the class, according to the traffic model. Within the method, the predicted traffic volume is optionally predicted for a future time $t+\tau$, wherein/is a current time and $\tau$ is a time interval, and wherein the traffic volume is optionally predicted based upon at least one item selected from the group consisting of: an available buffer size at a current time and at the future time, a number of congested queues of a priority of the class at the future time; a normalized dequeue rate of the queue at the future time; a priority of an application or site associated with the plurality of traffic units; and a coefficient associated with the class; and a physical location of the switch. Within the method, the predicted traffic volume is optionally predicted for a future time $t+\tau$ wherein t is a current time and $\tau$ is a time interval, and wherein the traffic volume is predicted based upon a normalized dequeue rate of the queue at the future time. Within the method, the predicted traffic volume is optionally predicted for a future time $t+\tau$ wherein t is a current time and $\tau$ is a time interval, and wherein the traffic volume is predicted based upon a priority of an application or site associated with the plurality of traffic units. Within the method, the predicted traffic volume is optionally predicted for a future time $t+\tau$ wherein t is a current time and $\tau$ is a time interval, and wherein the traffic volume is predicted based upon a coefficient associated with the class. Within the method, the predicted traffic volume is optionally predicted for a future time $t+\tau$ wherein t is a current time and $\tau$ is a time interval, and wherein the traffic volume is predicted based upon a physical location of the switch. Within the method, the predicted traffic volume is optionally predicted in accordance with the following formula: $T^i_c(t, t+\tau, location) = \alpha_c \cdot 1/Np'(t, t+\tau, location) \cdot \gamma_i^{c\prime}(t, t+\tau, location) \cdot (B-Boc'(t, t+\tau, location)$ wherein: i is an index of the port; c is a class of the plurality of traffic units; t is a current time; $\tau$ is a time difference to a future time; $\alpha_c$ is a coefficient assigned to class c; Location is the physical location of the switch within the data center; Np'(t, t+$\tau$, location) is a variation or combination of: Np(t, location) being a number of congested queues of a priority of the class at time t for the switch, and Np(t+$\tau$, location) being the number of congested queues of priority p of the class at time t+$\tau$ for the switch; $B-B_{oc}'(t, t+\tau, location)$ is a variation or combination of: $B-B_{oc}(t, location)$ being a remaining buffer at time t for the switch, and $B-B_{oc}(t+\tau, location)$ being a remaining buffer at time t+$\tau$ for the switch; and $\gamma^i_c{}'(t, t+\tau, location)$ is a variation or combination of: $\gamma^i_c(t, location)$ being a per-port-normalized dequeue rate of the queue of class c at time t for the switch, and $\gamma^i_c(t+\tau, location)$ being the per-port-normalized dequeue rate of the $i^{th}$ queue of class c at time t+$\tau$ for the switch. Within the method, the queue is optionally not emptied in a first in first out manner. Within the method, multiple traffic units are optionally dequeued simultaneously from the queue.

Another exemplary embodiment of the disclosed subject matter is a method for managing traffic in a communication network, comprising: receiving a plurality of traffic units to be transmitted by a switch through a port, the port having an associated queue; extracting features from the plurality of traffic units; providing the features to a first engine, to obtain a class for the plurality of traffic units; using a second engine associated with a traffic model for the class, obtaining an indication of a predicted traffic volume for the class for a future time and for the physical location of a switch that transmits the plurality of traffic units; operating an emulator system with a queue of a size corresponding to the indication of the predicted traffic volume; determining performance of the emulator system; subject to the performance improving over past performance of the communication system the of the performance, allocating the queue with a size corresponding to the indication of the predicted traffic volume; and operating the communication network with the queue. Within the method, the traffic unit is optionally a packet. The method can further comprise: receiving a preliminary plurality of traffic units to be transmitted; extracting features from each of the preliminary plurality of traffic units to obtain a plurality of feature vectors; clustering the plurality of feature vectors into a plurality of classes; and training the first engine to receive the plurality of traffic units and output the class from the plurality of classes. The method can further comprise: training the second engine upon a subset of the plurality of feature vectors assigned to a specific class, such that the second engine is adapted to provide the indication for the predicted traffic volume for the class, according to the traffic model. Within the method, the predicted traffic volume is optionally predicted for a future time t+τ wherein t is a current time and τ is a time interval, and the traffic volume is optionally predicted based upon at least one item selected from the group consisting of: an available buffer size at a current time and at the future time, a number of congested queues of a priority of the class at the future time; a normalized dequeue rate of the queue at the future time; a priority of an application or site associated with the plurality of traffic units; and a coefficient associated with the class; and a physical location of the switch. Within the method, the predicted traffic volume is optionally predicted in accordance with the following formula: $T^i_c(t, t+τ, location) = α_c \cdot 1/Np'(t, t+τ, location) \cdot γ_i^c{}'(t, t+τ, location) \cdot (B - Boc'(t, t+τ, location)$ wherein: i is an index of the port; c is a class of the plurality of traffic units; t is a current time; τ is a time difference to a future time; $α_c$ is a coefficient assigned to class c; Location is the physical location of the switch within the data center; Np'(t, t+τ, location) is a variation or combination of: Np(t, location) being a number of congested queues of a priority of the class at time t for the switch, and Np(t+τ, location) being the number of congested queues of priority p of the class at time t+τ for the switch; $B - B_{oc}'(t, t+τ, location)$ is a variation or combination of: $B - B_{oc}(t, location)$ being a remaining buffer at time t for the switch, and $B - B_{oc}(t+τ, location)$ being a remaining buffer at time t+τ for the switch; and $γ^i_c{}'(t, t+τ, location)$ is a variation or combination of: $γ^i_c(t, location)$ being a per-port-normalized dequeue rate of the queue of class c at time t for the switch, and $γ^i_c(t+τ, location)$ being the per-port-normalized dequeue rate of the $i^{th}$ queue of class c at time t+τ for the switch. Within the method, the queue is optionally not emptied in a first in first out manner. Within the method, multiple traffic units are optionally dequeued simultaneously from the queue.

Yet another exemplary embodiment of the disclosed subject matter is a non-transitory computer readable medium retaining program instructions, which instructions when read by a processor, cause the processor to perform: receiving a plurality of traffic units to be transmitted by a switch through a port, the port having an associated queue; extracting features from the plurality of traffic units; providing the features to a first engine, to obtain a class for the plurality of traffic units; using a second engine associated with a traffic model for the class, obtaining an indication of a predicted traffic volume for the class for a future time and for the physical location of a switch that transmits the plurality of traffic units; allocating a queue of a size corresponding to the indication of the predicted traffic volume; and assigning the plurality of traffic units to the buffer.

Yet another exemplary embodiment of the disclosed subject matter is a non-transient computer readable storage medium retaining program instructions, which program instructions when read by a processor, cause the processor to perform: extracting features from the plurality of traffic units; providing the features to a first engine, to obtain a class for the plurality of traffic units; using a second engine associated with a traffic model for the class, obtaining an indication of a predicted traffic volume for the class for a future time and for the physical location of a switch that transmits the plurality of traffic units; allocating a queue of a size corresponding to the indication of the predicted traffic volume; assigning the plurality of traffic units to the buffer; determining whether performance of the communication network has improved or deteriorated; and subject to deterioration of the performance: generating a penalty; and retraining the first engine or the second engine in accordance with the penalty.

Yet another exemplary embodiment of the disclosed subject matter is a non-transient computer readable storage medium retaining program instructions, which program instructions when read by a processor, cause the processor to perform: receiving a plurality of traffic units to be transmitted by a switch through a port, the port having an associated queue; extracting features from the plurality of traffic units; providing the features to a first engine, to obtain a class for the plurality of traffic units; using a second engine associated with a traffic model for the class, obtaining an indication of a predicted traffic volume for the class for a future time and for the physical location of a switch that transmits the plurality of traffic units; operating an emulator system with a queue of a size corresponding to the indication of the predicted traffic volume; determining performance of the emulator system; subject to the performance improving over past performance of the communication system the of the performance, allocating the queue with a size corresponding to the indication of the predicted traffic volume; and operating the communication network with the queue.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 6 is a flowchart of a method for determining queue thresholds, in accordance with some embodiments of the disclosure;

FIG. 7 is a flowchart of a method for determining and updating queue thresholds, in accordance with some embodiments of the disclosure;

DETAILED DESCRIPTION

Figure 1:
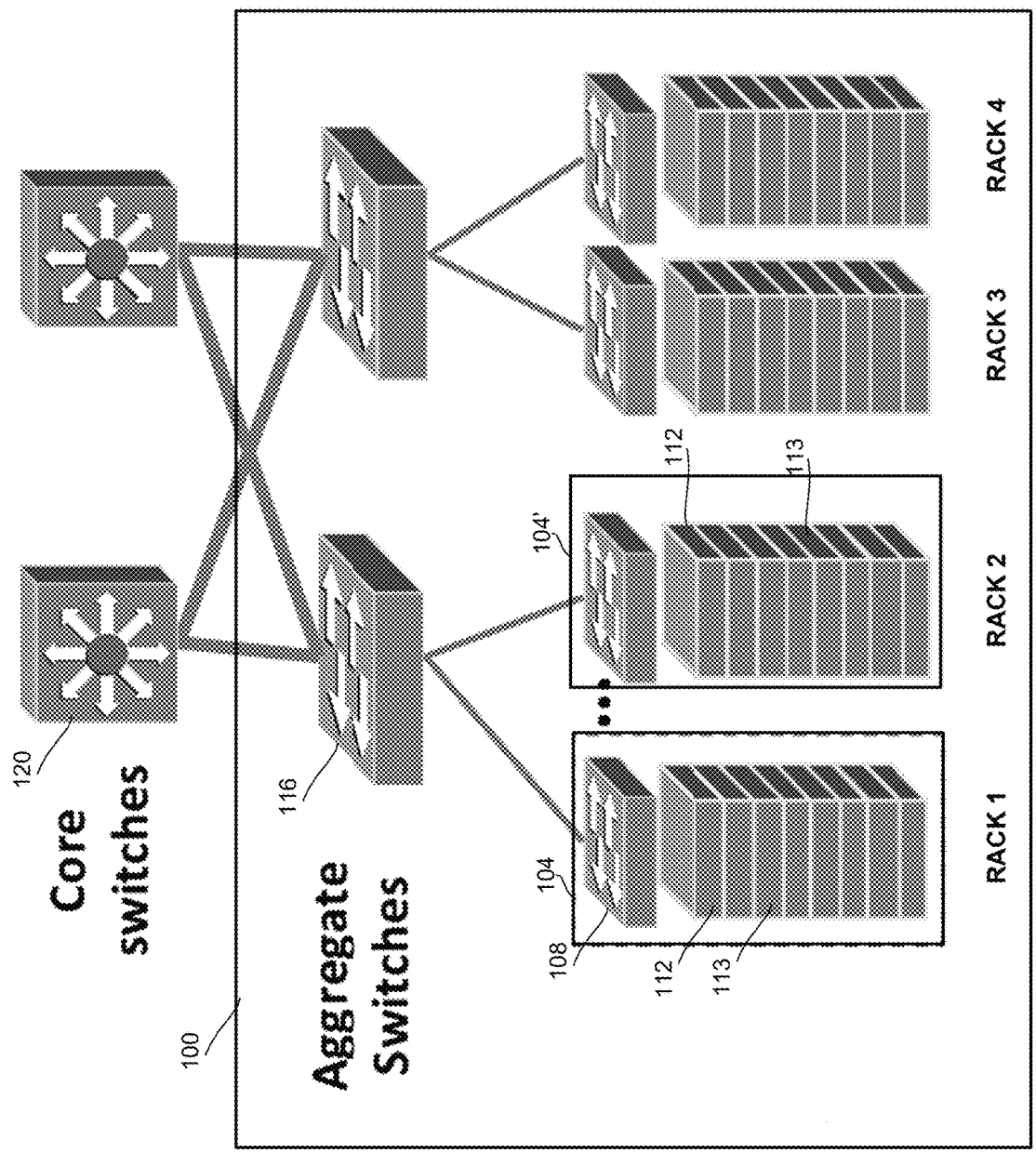
FIG. 1 shows a generalized diagram of a data center of Spine-Leaf type.

In all computerized networks, and in particular in data centers which may be heavily loaded due to the large number of applications and users, when all buffers are full, packets may get lost. Packet loss may create significant problems. The severity of the problems may depend on multiple factors, such as the type of the sending/receiving application, the type of transmitted data, the service level agreement (SLE) of the application or service, and others.

Although the discussion below refers to traffic units and packets interchangeably, it will be appreciated that the discussion is equally applicable to other traffic units as well.

Thus, one technical problem of the disclosure relates to a need for managing queues and buffers of ports in a data center, to optimize transmission performance, such that the chances of severe damages caused by important transmissions being lost are reduced.

Some known techniques for avoiding packet loss allocate multiple buffers from the available buffer space. In some embodiments, one or more buffers may be allocated for mass transmissions, such as transmissions comprising more than a predetermined number of packets, also known as elephant flows, and one or more buffers for smaller transmissions, referred to as mice flow.

Further known techniques allocate the buffers statically from the available pool, and may therefore fail to respond effectively and efficiently to transmission bursts. Further techniques use dynamic allocation, in accordance with the loads and the requirements at the transmission time. However, this still does not provide an adequate solution, as the situation may change drastically during the transmission such that the performance degrades drastically.

One technical solution of the disclosure relates to setting the queue thresholds, i.e., the volume of each queue, and accordingly allocating the buffers that store the queue dynamically from the available pool. However, the queue threshold is determined and buffer allocation is performed not only in accordance with the current situation and loads, as this may change due for example the current transmission and further transmissions that may occur or at least start during the current transmission. Rather, the queue threshold settings and allocation of buffers from the available pool are done in accordance with the predicted loads expected at a later time, during the time the transmission is expected to take place. The buffer allocation may also take into account the class or type of the transmitted packets, which may relate to the sending or receiving application, the volume of expected transmission, the SLE, the physical location of the transmitting switch, or other factors.

Another technical solution of the disclosure comprises training a first engine, such as a classifier, for classifying a plurality of packets within the transmission in order to obtain their class, such that the corresponding queue threshold and the allocated buffer size are in accordance with this class. For example, a transmission comprising a plurality of packets related to an application may be classified to a class that transmits large volumes of data, may be assigned to a larger buffer than a transmission related to an application classified to a class that transmits large volumes of data and vice versa.

Yet another technical solution of the disclosure comprises training a second engine, also referred to as a traffic model, for each such class, the engine adapted to compute for the particular class the appropriate queue threshold out of the available pool, at the future time when the transmission is expected to occur.

Yet another technical solution of the disclosure comprises testing the performance of the engines, and training the first engine and the second engine repeatedly, to accommodate for changing conditions or for imperfect weights used by the engines for prediction. The thresholds output by the engines may then be applied such that buffers are allocated accordingly and transmission is handled in accordance with the new parameters. The performance results may then be analyzed, e.g., determining throughput, whether congestions occurred, the number of high priority packets lost and the total number of lost packets, transition duration of the between the previous state with the previous thresholds and the new state with updated threshold, or the like. If the results are satisfactory, rewards and positive feedback may be provided. Otherwise, a penalty may be applied. The rewards and penalties may be used by the engines for selecting the thresholds, such that more choices are made which are like the ones that received positive rewards, thereby incrementally improving the performance, and vice versa.

The rewards and penalties may also be used when retraining the engines, which may be done repeatedly, for example periodically, when the amount or severity of penalties exceeds a threshold, or the like. In some embodiments, once the penalties reach a predetermined threshold, for example their sum or any other accumulation reaches or exceeds a threshold, the engines may be retrained, either incrementally with newly collected, data or retraining over the whole corpus.

Yet another technical solution of the disclosure comprises applying the newly obtained parameters, e.g. the queue size thresholds to an emulator system, also referred to as a "sandbox". The traffic throughput of the emulator or other parameters may then be tested without affecting the operative system. Only if the expected performance is satisfactory, the parameters may be applied to the operative system, otherwise the existing parameters may be maintained.

One technical effect of the disclosure is the optimization of queue thresholds and increased effectiveness of the buffer allocation, since it is adjusted to the requirements at the time the transmission is occurring, and not to the requirements as they are some time earlier. By setting the queue thresholds and allocating buffers of proportions which are adequate to the type of applications and the active requirements, fewer packets are dropped, and the service level may increase.

Another technical effect of the disclosure is the option to adapt the thresholds repeatedly, to accommodate for changes in the characteristics of the communication through the network and thereby improve the performance.

Yet another technical effect of the disclosure comprises assessing the performance with the thresholds, determine rewards or penalties, and keep training the engines, for further improvement, for example when the penalties reach a predetermined thresholds.

Yet another technical effect of the disclosure is the option to test the newly obtained parameters in a testing system which may also be an emulator, without risking the performance of the operative system. Only if the new parameters prove efficient in the testing system, they may be applied to the operative system.

Referring now to FIG. 1, showing a partial generalized diagram of data center of a Spine-Leaf type, consisting of plurality of points of delivery (PODs) 100 each including a top of the rack switch 108 and one or more aggregate switches 116. The data center may also comprise a plurality of core switches 120. Each POD 100 may comprise a plurality of racks, such as rack 1 (104), rack 2 (104') or the like.

Rack 1 (104) may comprise a plurality of servers such as server 112, server 113 and others. Rack 1 (104) may also comprise a Top of Rack (ToR) switch 108. ToR switch 108 is responsible for providing data to any of servers 112, 113 and others and receiving data to be provided to a destination from any of servers 112, 113 and others.

POD 100 may comprise one or more aggregate switches 116, each responsible for providing data to any of servers 112, 113 within two or more racks such as rack 1 (104) and rack 2 (104'), and receiving data to be provided to a destination from any of servers 112, 113 within the two or more racks.

The data center may comprise one or more core switches 120 that enable communication and data transfer between two or more aggregate switches 116 of one or more PODs 100, and thus between multiple racks and multiple servers within the data center.

The data center may comprise data center core switches (not shown) for enabling communication and data transfer between two or more PODs 100, and data center edge switches (not shown) for enabling communication between the data center and other data centers or servers anywhere in the cyber space.

It will be appreciated that the disclosed structure is exemplary only, and any other structure that connects various servers and enables them to send and receive data therebetween, or between any of them and another source or destination computing platform in the cyber space may be used.

It will be appreciated that the higher the position of the switch in the switch hierarchy, the switch may be required to serve data of more types, to or from more types of applications, at more dispersed hours, or the like. For example, data center core switches 120 may serve more diverse transmissions than ToR switch 108.

As each application and transmission circumstances are different, so are their needs. Some applications need to transmit small amount of data but need to do it at a latency as small as possible, while others, such as backup transmissions need to transmit large amounts but a longer latency may be tolerated. The criticality of each transmitted packet may also vary. For example, in a music delivery application, the loss of some packets may be less severe and more easily tolerated than in a banking application.

The technical problem disclosed above may be applicable to any of the switches shown or discussed in association with FIG. 1, such as ToR switch 108, aggregate switch 116, core switches 120, data center core switches and data center edge switches. When data is required to be transmitted and the channel is busy, a buffer may be populated with the data to be transmitted, and similarly for data to be received when the destination is busy.

Thus, one existing technology relates to dividing the available space for buffer into two: a first buffer for handling small transmissions, referred to as mice flow queue, which may be used for storing the first packets of each transmission, and a second buffer referred to as elephant flow queue, for handling large transmissions, and in particular all packets associated with a transmission excluding the first ones which are assigned to the mice flow queue. It will be appreciated that the terms buffer and queue are used interchangeably.

A known mechanism for handling the drop problem is the Approximate Fair Dropping (AFD) with Dynamic Packet Prioritization (DPP). AFD focuses on preserving buffer space to absorb mice flows, particularly microbursts, which are aggregated mice flows, by limiting the buffer use of aggressive elephant flows. The scheme may also enforce bandwidth allocation fairness among elephant flows, as detailed below. DPP provides the capability of separating mice flows and elephant flows into two different queues, so that buffer space can be allocated to them independently, and different queue scheduling can be applied to them.

A feature of the AFD algorithm is the fair allocation of bandwidth among elephant flows based on their data rates. This feature has two main elements: data rate measurement and fair rate calculation.

Data rate measurement relates to measuring the arrival rate of each elephant flow on the ingress (i.e., enter) port and passing it to the buffer management mechanism on the egress (i.e., exit) port.

Fair rate calculation relates to dynamically computing a per-flow fair rate for an egress queue using a feedback mechanism based on the occupancy of the egress port queue.

When a packet of an elephant flow enters the egress queue, the AFD algorithm compares the measured arrival rate of the flow with the computed per-flow fair-share rate.

If the arrival rate is less than the fair rate, the packet will be queued and eventually transmitted to the egress link.

If the arrival rate exceeds the fair rate, the packet will be randomly dropped from that flow, in proportion to the amount by which it exceeds the fair rate. The drop probability is thus computed using the fair rate and the measured flow rate. The more a flow exceeds the fair rate, the higher is its drop probability, therefore, all elephant flows achieve the fair rate.

AFD, being a flow-aware early-discard mechanism that signals network congestion and engages the TCP congestion mechanism on the application hosts by dropping packets, is an improvement relative to earlier methods such as weighted random early discard, or Weighted Random Early Detection (WRED). WRED applies weighted random early-discard to class-based queues, but does not utilize flow awareness within a class, such that all packets, including packet-loss sensitive mice flows, are subject to the same drop probability, therefore, packets from mice flows are as likely to be dropped as packets from elephant flows. Although elephant flows can use drops as congestion signals to back off, drops can have a harmful effect on mice flows. In addition, the same drop probability may cause elephant flows with a higher rate (due to short round-trip time) to obtain more bandwidth.

Therefore, egress bandwidth may not be evenly divided among elephant flows traversing the same congested link. As a result, the flow completion time for mice flows deteriorates, and elephant flows do not have fair access to the link bandwidth and buffer resources.

AFD, however, takes into account the flow sizes and data arrival rates before making a drop decision. The dropping algorithm is designed to protect mice flows and to provide fairness among elephant flows during bandwidth contention.

Figure 2:
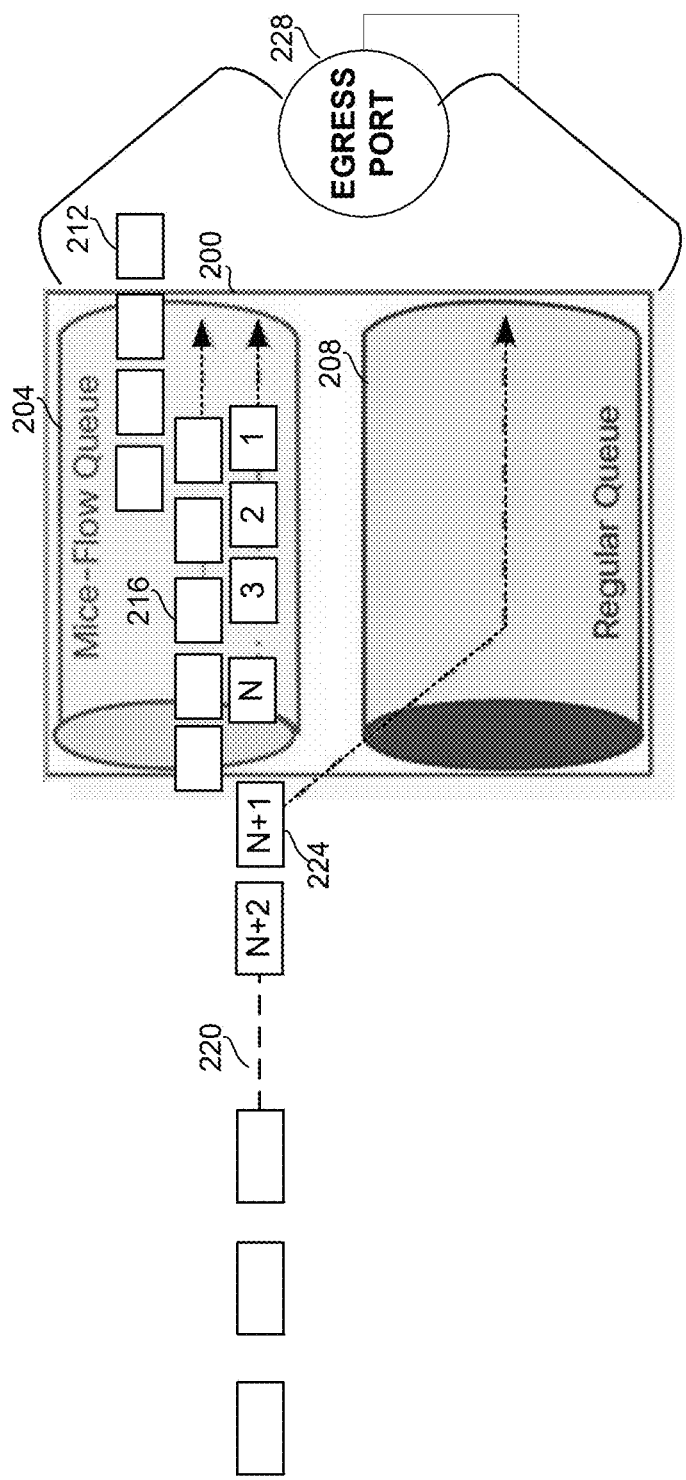
FIG. 2 shows a schematic illustration of the Approximate Fair Dropping (AFD) scheme.

Referring now to FIG. 2, showing a schematic illustration of the AFD scheme, with a pair of queues: mice flow queue 204 and regular (elephant flow) queue 208. In the example of FIG. 2, the mice flow queue may be limited to streams of at most N packets (N=5). A short stream of packets, such as stream 212 comprising four packets may be stored exclusively in mice flow queue 204 and transmitted onward when possible. Similarly for stream 216, which is in the process of being stored within mice flow queue 204. Stream 220, however, is longer. Thus, the first N packets are indeed assigned to mice flow queue 204, while the rest of the packets, starting at packet N+1 (224), is assigned to regular queue 208. Both queues output the packets stored therein through egress port 228.

Thus, traditional network management only allows to deploy a predefined set of buffer management policies whose parameters can be adapted to specific network conditions. The incorporation of new management policies requires complex control and data plan code changes and sometimes redesign of the implementing hardware.

However, current developments in software-defined networking mostly ignore these challenges and concentrate on flexible and efficient representations of packet classifiers that do not handle well the buffer management aspects well.

Traditionally, queues implement First-In-First-Out (FIFO) processing order, and as known there is no deterministic optimal algorithm for a single queue (SQ) architecture, weighted throughput objective, and FIFO processing.

Figure 3:
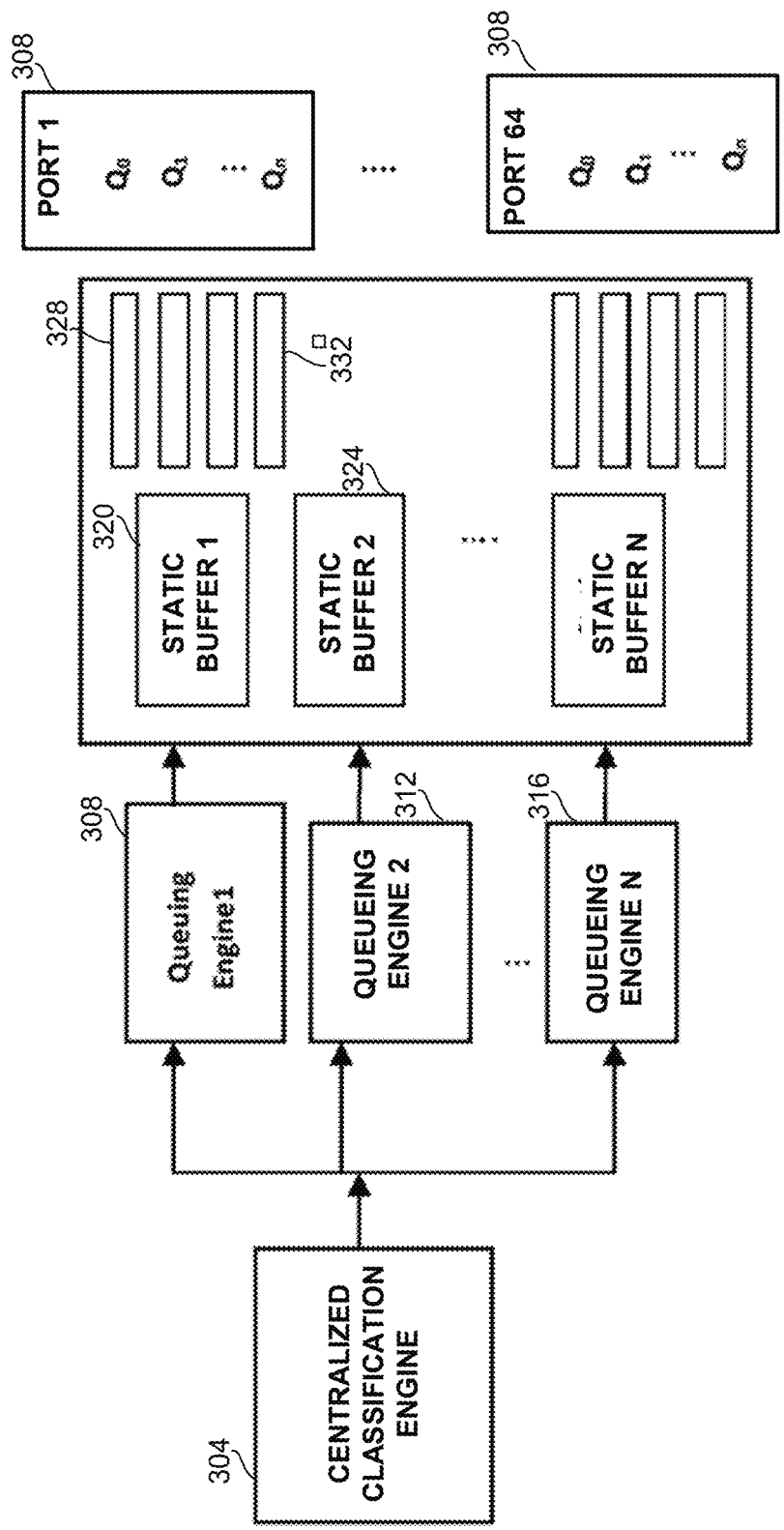
FIG. 3 shows a schematic diagram of a traditional static switch architecture deployed in data centers.

Referring now to FIG. 3, showing a schematic diagram of a traditional static switch architecture deployed in data centers, which has a central packet processing and classification engine.

The architecture employs a centralized classification engine 304, which classifies the incoming packet streams. When a packet is received at the switch, this engine examines the destination and source addresses, compares them to a table of network segments and addresses, and determines a class for the packets.

In correspondence to the determined class, the packets are forwarded to one of the queuing engines in accordance with the classification, such as queueing engine 1 (308), queueing engine 2 (312), queueing engine N (316), or the like, wherein N is the number of classes. Additionally, centralized classification engine 304 prevents bad packets from scattering by not forwarding them.

Each queueing engine places the relevant packets in its static buffer such as static buffer 1 (320), static buffer 2 (324), or the like, and specifically within the relevant queue in accordance with the port associated with each packet. For example static buffer 1 (320) has first queue 328 associated with Q0 of port 1, Nth queue 332 associated with QN of port 1, and so on.

Thus, the static buffer is partitioned with a constant buffer size for each queue. As packets are processed in the switch, they are held in the buffers.

In this arrangement the dynamic buffer is split into separate, virtual buffer pools wherein each virtual buffer is assigned to each port. In each virtual buffer, the packets are organized into logical FIFO queues.

If the destination segment is congested, the switch holds the packet, awaiting the bandwidth to become available on the congested segment. In static buffers, once the buffer is full, additional incoming packets will be dropped. Hence, it is important to reduce the packet loss ratio to support any application over the computer network. In order to achieve this goal, the buffer size may be increased and the core network may have very large static buffers, but this can considerably add to the system cost, operational complexity, less deterministic and impulsive application performance, and longer queuing delays. Thus, this arrangement also provides insufficient results.

Therefore, an advanced dynamic buffer management scheme should support: (1) low queuing delays; (2) control of the queue length to prevent overflow and underflow; and (3) lower packet loss ratio.

In such schemes, referred to as Dynamic Threshold (DT), the size of each queue needs to be determined in accordance with a threshold applicable to the queue, which may be proportional to the remaining space in the buffer. The scheme may use parameters such as average queue length, and minimal and maximal threshold value of the queue length.

When the congestion level is low, the threshold values may be automatically increased in order to delay activation of the congestion control, and when the congestion level is high, the threshold value may be automatically decreased in order to activate the congestion control earlier.

When the average queue length is less than the minimum threshold, none of the packets is dropped, when the queue length is between the minimal and maximal thresholds the packets may be dropped in a linearly rising probability, and when the queue length exceeds the maximum threshold, all packets are dropped. Thus, such scheme may avoid congestion by not letting the queue to fill up.

In further schemes, network devices may share a buffer across priority queues to avoid drops during transient congestion.

While cost-effective most of the time, low-priority traffic can cause increased packet loss to high-priority traffic. Similarly, long flows can prevent the buffer from absorbing incoming bursts even if they do not share the same queue. Therefore, buffer sharing techniques are unable to guarantee isolation across (priority) queues without statically allocating buffer space.

While Congestion Control (CC) algorithms and scheduling techniques can alleviate the shortcomings of DT, they are unable to address them fully.

Indeed, CC can decrease the buffer utilization indirectly leaving more space for bursts, while scheduling could allow preferential treatment of certain priority queues across those sharing a single port. Yet, each of these techniques may sense and control distinct network variables:

First, CC can only sense per-flow performance (e.g., loss or delay) but is oblivious to the state of the shared buffer and the relative priority across competing flows. Worse yet, CC controls the rate of a given flow but cannot affect the rate at which other flows are sending. Thus, CC cannot resolve buffer conflicts across flows sharing the same device.

Second, scheduling can only sense the per-queue occupancy and control the transmission (dequeue) of packets via a particular port after and only if they have been enqueued. As a result, scheduling cannot resolve buffer conflicts across queues not sharing the same port.

To reduce cost and maximize utilization, network devices often rely on a shared buffer chip whose allocation across queues is dynamically adjusted by a buffer management algorithm, for example DT.

DT dynamically allocates a buffer per queue, proportionally to the still-unoccupied buffer space. As a result, the more queues share the buffer, the less buffer each of them is allowed to occupy. Despite its wide deployment, DT does not meet the requirements of the multi-tenant data-center environments for three key reasons:

First, DT cannot reliably absorb bursts, which are of paramount importance for application performance. Second, DT is unable to offer any isolation guarantee, meaning that the performance of traffic, even high priority traffic, is dependent on the instantaneous load on each device it traverses. Third, DT is unable to react to abrupt changes in the traffic demand, as it keeps the buffer highly utilized (to improve throughput), even if this brings little benefit.

Worse yet, more advanced approaches that allocate part of the buffer space to queues, effectively waste precious buffer space that could be put to better use, such as absorbing bursts.

DT dynamically adapts the instantaneous maximum length of each queue, namely its threshold Tic(t) according to the remaining buffer space and a configurable parameter α, for example in accordance with the following formula:

$$Tic(t) = \alpha ic \cdot (B - Q(t)), \text{ wherein;}$$

$T^i_c(t)$ is the queue threshold of class c in port i, i.e., the allocated queue size;

c is a class associated with the transmission;

$\alpha^i_c$ is a parameter of class c in port i;

B is the total buffer space; and

Q(t) is the total buffer occupancy at time t.

The α parameter of a queue impacts its maximum length and its relative length with respect to the other queues.

Thus, an operator is likely to set higher a values for high-priority traffic classes as compared to low-priority ones.

However, despite its importance, there is no systematic way to configure α, meaning that different data centers vendors and operators may use different α values. Assuming that data center operators group traffic into classes, each class exclusively uses a single queue at each port to achieve cross-class delay isolation. For instance, storage, VoIP and MapReduce may belong to distinct traffic classes. Also assuming that each traffic class is of high or low priority, distinguishing classes to high and low priority facilitates prioritizing of certain classes over others in times of high load.

This prioritization concerns the use of the shared buffer and does not affect scheduling.

The operator can configure multiple low-priority classes and multiple high-priority classes. In a cloud environment, traffic that is subject to Service Level Agreements (SLAs) would be high-priority.

Figure 4:
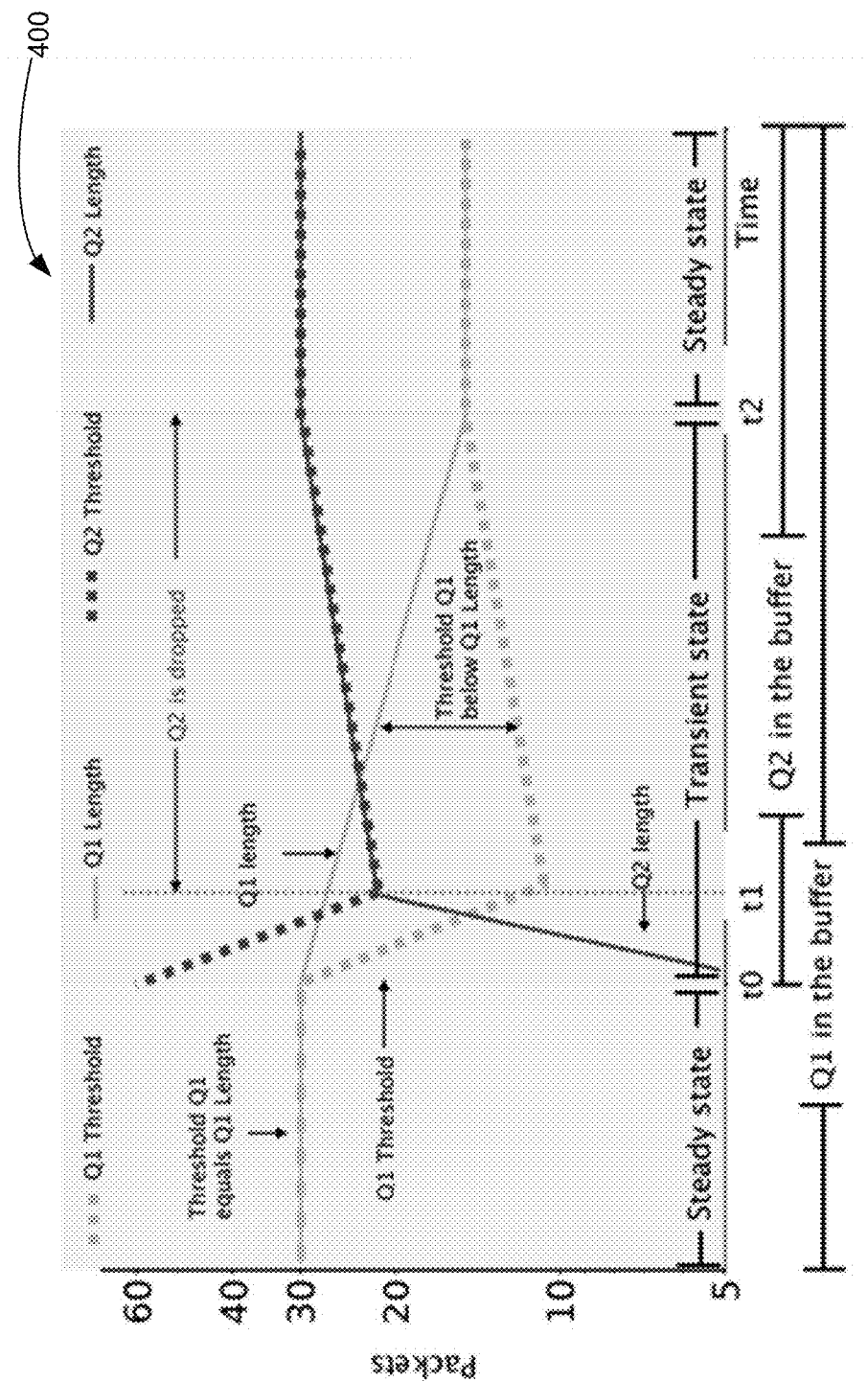
FIG. 4 shows a is a performance graph of a dynamic thresholding scheme.

Referring now to FIG. 4, showing a performance graph 400 of the DT scheme. At time t0, an incoming burst Q2 rapidly changes the buffer occupancy. In the transient state (t0 . . . t2) the threshold of Q1 is lower than its length. Thus, all its incoming packets are dropped to free buffer for Q2. Still, Q2 experiences drops before reaching its fair steady state allocation (time t1 . . . t2).

It is seen that the high-priority burst (for Q2) was dropped before the buffer had reached steady state. These drops could have been avoided if: (i) there was more available buffer when the burst arrived (steady-state allocation); or (ii) the buffer could have been emptied faster to make room for the burst (transient-state allocation).

Thus, DT demonstrates the following inefficiencies:

1. DT offers no minimum buffer guarantee: DT enforces the precedence of a queue or class over the others via a static parameter (α). Yet, α offers no guarantee as the actual per-queue threshold depends on the overall remaining buffer, which can reach arbitrarily and uncontrollably low values, even in the steady state.

2. DT offers no burst-tolerance guarantees: in addition to the unpredictability of its steady-state allocation, DT's transient state allocation is uncontrollable. This is particularly problematic when it comes to burst absorption. The main reason for this limitation is that DT perceives buffer space as a scalar quantity ignoring its expected occupancy over time.

An enhanced dynamic scheme limits the buffer space each queue can use, depending on both queue-level and buffer-level information.

Particularly, a threshold, which is the maximum length of each queue is defined and the buffer volume may be allocated as follows:

$$T^i_c(t) = \alpha_c \cdot 1/N_p(t) \cdot \gamma^i_c(t) \cdot (B - B_{oc}(t))$$

wherein:

c is the class associated with the transmission;

$T^i_c(t)$ is the threshold size, i.e., the length of the queue assigned to the $i^{th}$ port of class c;

$\alpha_c$ is a value assigned to the class that the queue belongs to;

$N_p(t)$ is the number of congested (non-empty) queues of the priority (low or high) that the class belongs to. If there is a small number of non-empty queues, a larger threshold may be allocated, and vice versa;

$\gamma^i_c(t)$ is a the per-port-normalized dequeue rate of the queue associated with the port, i.e., the clearing rate of the specific queue; and B is the total buffer, $B_{oc}(t)$ is the occupied buffer therefore $B-B_{oc}(t)$ is the remaining buffer.

This formula may handle situations such as generally high load, but little load for a particular class such that a smaller space is sufficient for that queue, high load but high dequeuing rate of the relevant queue such that a smaller space is sufficient for that queue, or the like.

Np(t) bounds the steady-state allocation. The per-queue thresholds are divided by Np. The consequence of this factor to the allocation is twofold: (i) it bounds the per-class and per-priority occupancy; and (ii) it allows weighted fairness across classes of the same priority.

$\gamma^i_c(t)$ indicates the transient state's duration. A buffer is allocated to each queue proportionately to its dequeuing rate (γ). The γ factor, combined with the upper bounds, can change the duration of the transient state. Indeed, given some amount of buffer per priority, it is split into queues proportionately to their evacuation rate, effectively minimizing the time it takes for the buffer to be emptied. In effect, the time needed to transition from one steady-state allocation to another is reduced.

The above scheme thus improves throughput and reduces queuing delays, while ensuring the absorption of a given burst, by handling situations such as generally high load, but little load for a particular class, high load but high dequeuing rate of the relevant queue, or the like.

However, as clearly seen from the formula above, all time-related factors are calculated based on the current time, when the packets is received, but once the transmission starts and is in progress, the factors may change and their values may thus be less relevant and useful, and may therefore provide deficient results. This formula thus does not provide a sufficient solution either.

Therefore, in accordance with the disclosure, the dynamic threshold for a buffer, i.e., the queue length, may be determined in accordance with the time it is expected to take place, and the particular transmitting switch. For example, the threshold may be computed in accordance with the following formula:

$$T_c^i(t, t + \tau, \text{location}) =$$
$$a_c \cdot 1/N_p'(t, t + \tau, \text{location}) \cdot \gamma_c^{i\prime}(t, t + \tau, \text{location}) \cdot (B - B_{oc}'(t, t + \tau, \text{location}))$$

wherein:
- i is an index of the port to which the traffic units are destined;
- c is a class of the plurality of traffic units;
- t is a current time
- τ is a time difference to the future time,
- $\alpha_c$ is a coefficient assigned to class c; and
- Location is the physical location of the switch within the data center, provided for example as combination of top of rack switch identifier and core switch identifier;
- Np'(t, t+τ, location) is a variation or combination of: Np(t, location) being the number of congested queues of priority p of the class at time t for the particular switch, and Np(t+τ, location), being the number of congested queues of priority p of the class at time t+τ for the particular switch. For example, the value may be equal to any of the numbers, an average thereof, or the like.
- B is the total buffer, $B_{oc}$(t, location) is the occupied buffer at time t, $B_{oc}$(t+τ, location) is the occupied buffer at time t+τ, and B−Boc'(t, t+τ, location) is a variation or combination of: B−$B_{oc}$(t, location) being the remaining buffer at time t for the particular switch, and B−$B_{oc}$(t+τ, location) being the remaining buffer at time t+τ for the particular switch. For example, the value may be equal to any of the numbers, an average thereof, or the like.
- $\gamma_c^{i\prime}$(t, t+τ, location) is a variation or combination of: $\gamma_c^i$(t, location) being the per-port-normalized dequeue rate of the $i^{th}$ queue of class c at time t for the particular switch, and $\gamma_c^i$(t+τ, location) the per-port-normalized dequeue rate of the $i^{th}$ queue of class c at time t+τ for the particular switch. For example, the value may be equal to any of the numbers, an average thereof, or the like.

The values of Np(t+τ, location), $B_{oc}$(t+τ, location) and γic(t+τ, location) may be obtained from an engine, such as an artificial intelligence engine for example a neural network, trained upon a plurality of transmissions at various times, switches or the like.

In some embodiments, preferred values of τ may also be learned, based for example on t, including for example the time, day, month, etc., and location of the switch which may also imply its specific behavior at the relevant times. Generally speaking, τ may vary between a few milliseconds, a few seconds and a few minutes, which is the time frame for most transmissions, such that setting the threshold may be helpful in eliminating or reducing dropped packets. Location of the switch may be expressed as the specific switch identifier.

In some implementations of the disclosure, γic(t+τ, location), being the clearing rate of a queue, may be higher than in conventional methods, since it is not limited by the first in first out (FIFO) mechanism, as multiple packets may be output simultaneously.

Figure 5:
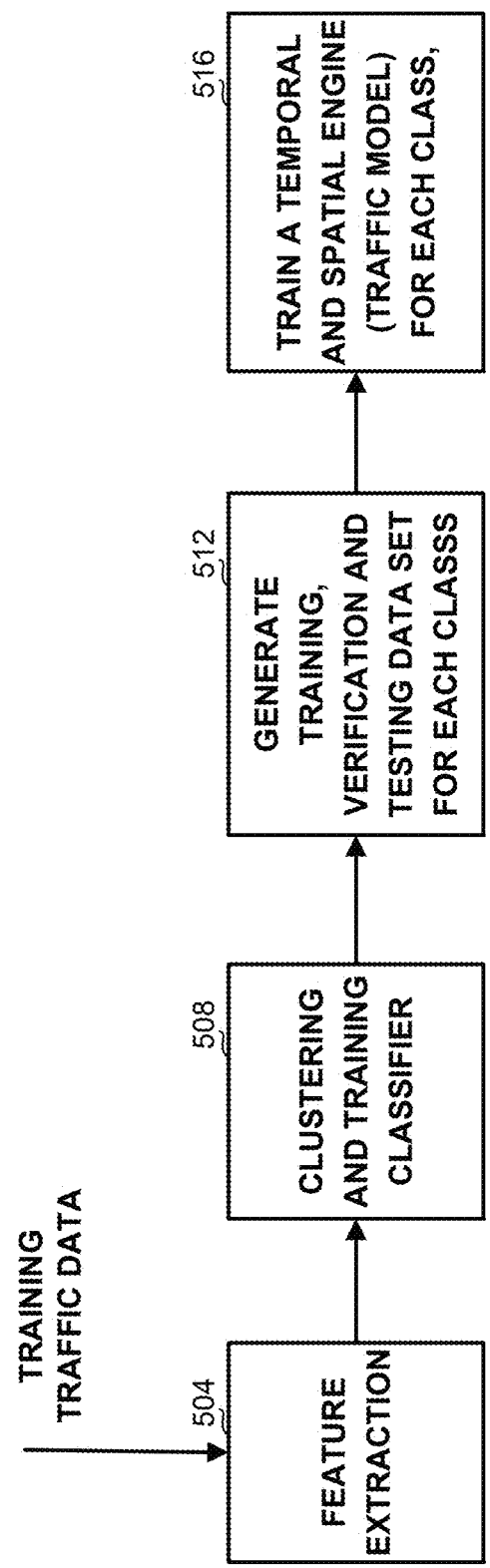
FIG. 5 shows flowchart of steps in a method for training engines for classifying transmissions and determining buffer sizes, in accordance with some exemplary embodiments of the disclosure.

Referring now to FIG. 5, showing a flowchart of steps in a method for training engines for classifying transmissions and determining buffer sizes, in accordance with some exemplary embodiments of the disclosure.

The method may be performed by any computing platform, whether associated with a particular switch or a particular data center or not.

On step 504, features may be extracted from incoming training traffic data, comprised of traffic units such as packets. The traffic units are to be transmitted by a switch through a port, the port having an associated queue. The features may include, for example the source address, the destination address, the packet arrival rate, the time and date, the specific switch and the specific data center, the priority level (e.g., service level agreement or MapReduce which relates t parallel computing would imply a high priority), or the like. The features may be extracted from one packet or a sequence of packets arriving within a predetermined time interval.

On step 508, the feature vectors may be clustered into distinct clusters, each cluster having characteristics that are more similar to characteristics of other feature vectors assigned to the cluster than to those assigned to other clusters. Any currently known clustering algorithm, or a clustering algorithm that will become known may be applied, such as but not limited to K-means, Gaussian Mixture Model, Support Vector Machine, Density-based, Distribution based, Centroid-based, or Hierarchical based.

A classifier may then be trained upon the feature vectors and the cluster assigned to each vector, such that given another vector, the classifier outputs the most appropriate cluster.

On step 512, data sets relevant to each of the clusters may be generated upon the traffic data assigned to the cluster. The data sets may comprise the feature vectors assigned to each particular class. The data sets may be divided into training, verification and testing data sets.

On step 516, an artificial intelligence (AI) engine, also referred to as a traffic model, implemented for example as a neural network, a deep neural network, or other may be trained upon the training data sets. The traffic model is used for predicting the load on the particular queue Np(t, t+τ, location), the available memory $B_{oc}$(t, t+τ, location) and the evacuation rate γic(t, t+τ, location) at the future time+τ for the switch at the particular location. Each data set from the training data set, comprising one or more feature vectors, may be associated with relevant values, referred to as ground truth. For example, for a plurality of τ values and location values identifying the switch, each vector in the training data set may be associated with a calculated (using the predictive analytics) value of Np(t, t+τ, location), $B_{oc}$(t, t+τ, location) and γic(t, t+τ, location). The value may be calculated from the plethora of information accumulated for the switch and the time t.

Each traffic model is thus trained upon feature vectors of one cluster, to output the values of Np(t, t+τ, location), $B_{oc}$(t, t+τ, location) and γic(t, t+τ, location) for each feature vector and one or more τ values, indicating said values at time interval τ after time t. The engine may also be trained to output the τ value that provides the best values or value combination. Such values may indicate, for example, that postponing the transmission by a small τ may enable to obtain a larger queue, and avoid the risk of losing packets. Each such engine is a spatio-temporal engine, as it receives the time and the switch location.

Once the engines are trained and represent the traffic models, the engines may be verified using the verification data sets for the tuning of the model's hyperparameters and tested using the testing data sets, to avoid over fitting.

It will be appreciated that in further embodiments, the same engine may be adapted to process feature vector combinations of various classes, with the class indication, and operate in accordance with the relevant class.

Referring now to FIG. 6, showing a flowchart of steps in a method for determining queue thresholds, i.e., the volume of the buffer to be assigned to a particular queue, in accordance with some exemplary embodiments of the disclosure.

The method may be performed by any computing platform, such as a computing platform that belongs to or is in communication with a particular switch, in order to obtain fast results so as not to add unacceptable delays to the transmission.

On step 604, features may be extracted for the incoming traffic, similar to step 504 above.

On step 608, the feature vectors may be provided to the classifier trained on step 508 above, to obtain a class for a set of one or more feature vectors. The class may correspond to one of the clusters into which the training traffic data of FIG. 5 has been clustered. Once the feature vector(s) has been assigned to a class, this may imply a selection of the AI engine relevant for the class.

On step 612, the specific engine may be applied to the feature vector, to obtain one or more sets of values an indication of a predicted traffic volume. For example, for one or more values of $\tau$, each set of predicted values may comprise $Np(t, t+\tau, location)$, $B_{oc}(t, t+\tau, location)$ and $\gamma ic(t, t+\tau, location)$. In some embodiments, the engine may also output the t value which provides the best combination of $Np$, $B_{oc}$ and $\gamma ic$. In an alternative embodiment the class may be provided with the feature vector to a single engine, which internally operates a specific engine according to the class.

On step 616, the results may be combined for the particular feature vector. For example, the values for the current time, i.e., $\tau=0$ may be compared to one or more sets of values obtained for other values of $\tau$, or the values for the current time may be combined for example averaged with values relevant for other values of $\tau$, or the like.

The resulting threshold may then be applied, and the queue of the relevant port may be assigned a volume in accordance with the threshold.

As disclosed above, $\gamma_c^i$ may be higher than in conventional methods, if the queue is not limited to operating in the first-in-first-out (FIFO) paradigm. This may be enabled, for example, by using optical transmission, as detailed for example in PCT publication no. WO2022/208271 titled "Optical Switch with All-Optical Memory Buffer", and assigned to the same assignee as the present Application.

In addition, buffer capacity and management policy can be improved by implementing time division multiplexing for optical transmission, as detailed for example in PCT publication no. WO2022/162477, granted as U.S. Pat. No. 12,034,527, titled "System for Pulsed Laser Optical Data Transmission with Receiver Recoverable Clock", and assigned to the same assignee as the present Application.

Referring now to FIG. 7, showing a flowchart of a method for determining and updating queue thresholds, in accordance with some exemplary embodiments of the disclosure.

Steps 604, 608, 612 and 616 are as detailed in association with FIG. 6 above.

Once the new thresholds are applied, at step 720 the system may be operated with the new thresholds, and buffers may be allocated accordingly.

At step 724, the performance of the system with the new thresholds may be analyzed. For example, one or more of the following measures may be determined: the throughput, whether congestions occurred, the number of high priority packets lost, the total number of lost packets, the duration of the transition between the previous state with the previous thresholds and the new state with updated threshold, or the like.

At step 728 the performance as calculated for the traffic with the new thresholds may be compared, for example to previously calculated performance.

If the performance has improved, for example the throughput has increased, less congestions occurred, less packets in general or high priority packets are lost, the transition duration between the previous state with the previous thresholds and the new state with updated threshold has not increased, or the like, at step 732 the weights used by the classification engine and the prediction engine(s) may be positively feedbacked, e.g., a reward for satisfactory results may be applied. This may strengthen the confidence of the engines in output results. Moreover, if and when the model is incrementally trained or fully retrained again at step 740 this feedback may be used for better training the engines.

If the performance has deteriorated, for example the throughput has decreased, more congestions have occurred, more high priority packets lost more packets lost, the duration of the transition increased or exceeds a predetermined threshold, or the like, then at step 736 a penalty may be generated for the engines, such that the engines are more likely to output different thresholds. Moreover, when the engines are retrained, the newly calculated weights may be affected by the penalties and rewards associated with the previous weights.

Figure 8:
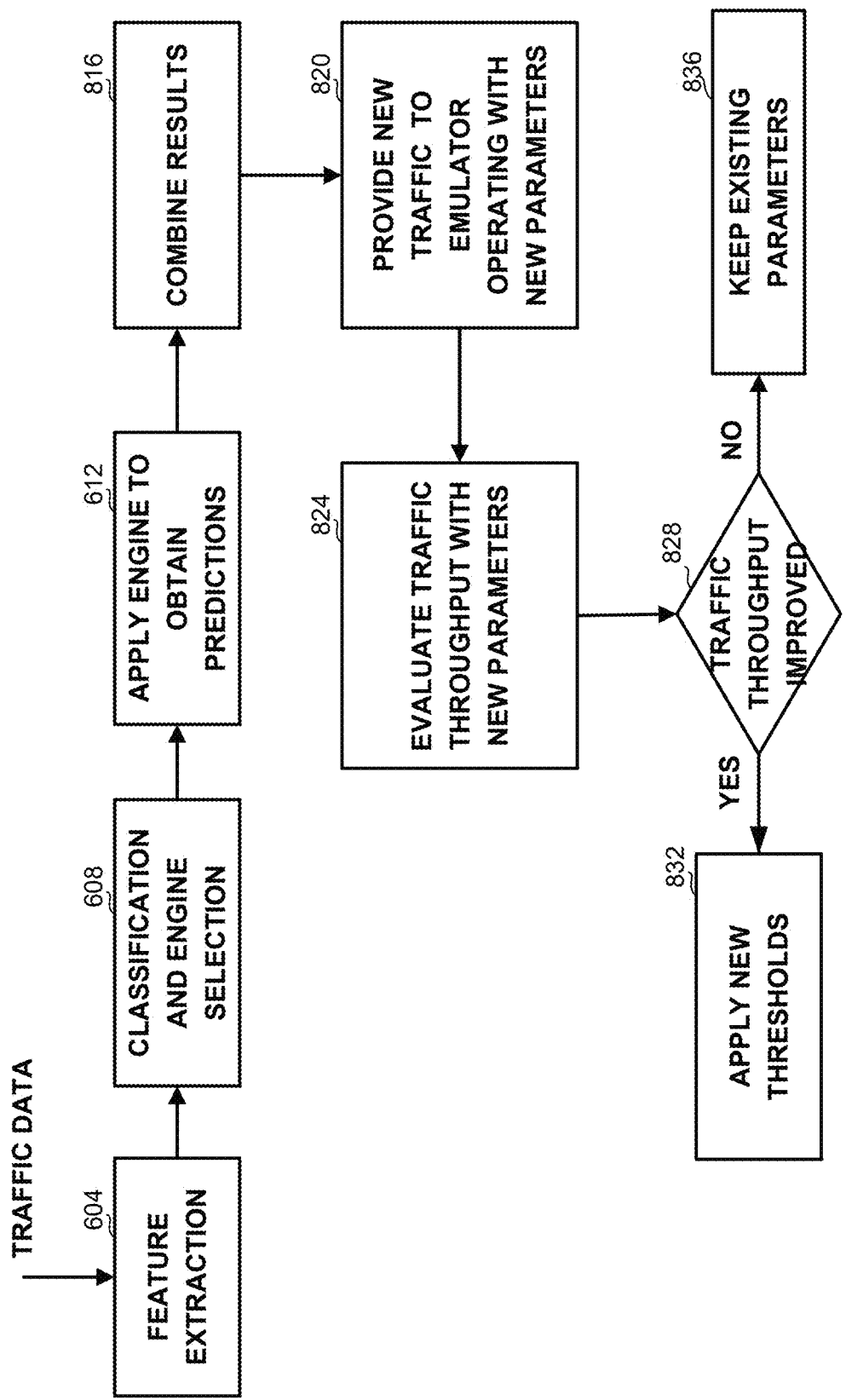
FIG. 8 is a flowchart of a method for testing new queue thresholds, in accordance with some embodiments of the disclosure.

Referring now to FIG. 8, showing a flowchart of a method for testing new queue thresholds, in accordance with some exemplary embodiments of the disclosure.

Steps 604, 608 and 612 are as detailed in association with FIG. 6 above.

At step 816, the results may be combined as detailed in association with step 616 above, but may not be applied to the engines yet.

At step 820, the new thresholds may be applied to an emulator system rather than to the operative system. The emulator system may receive and transmit a duplication of the actual transmission as exchanged in the operative system. The emulator system may or may not be of the same size, or have the full features as the operative system.

At step 824, the performance of the emulator system may be evaluated, for example the throughput of the emulator system, the number of lost packets, the number of high priority packets lost and the total number of lost packets, transition duration between the previous state with the previous thresholds and the new state with updated threshold, or the like.

At step 828 it may be assessed whether the new thresholds are effective, e.g., whether the throughput has improved, the number of lost high priority packets or total number of lost packets has decreased, the number of congestions has decreased, transition duration the between the previous state with the previous thresholds and the new state with updated threshold, or the like.

If the new thresholds are indeed effective, at step 832 the new thresholds may be applied to the operative system, otherwise at step 836 the existing thresholds may be kept for the operative system. The emulator system may be later operated again for trying new thresholds.

Figure 9:
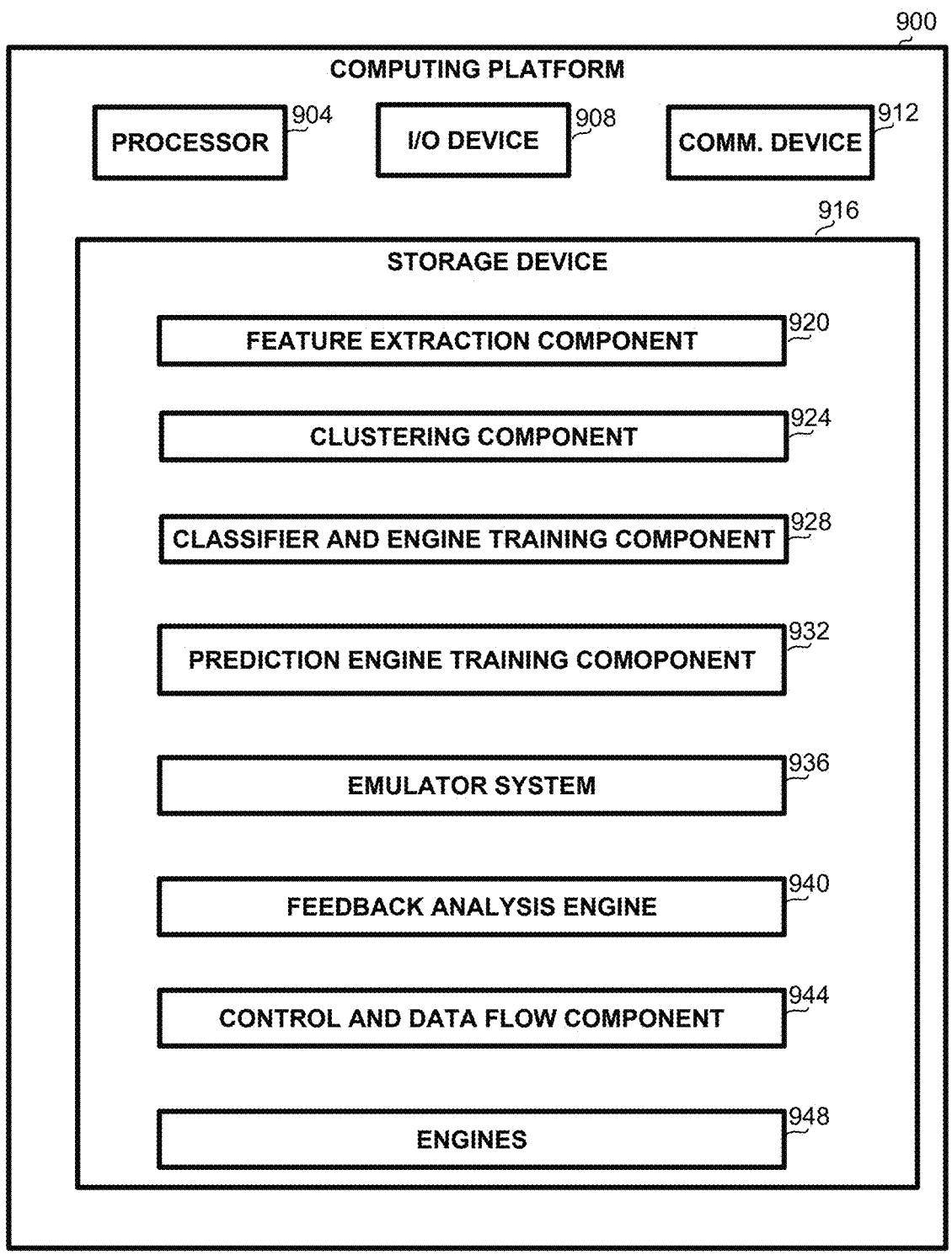
FIG. 9 is block diagram of a system for determining queue thresholds, in accordance with some embodiments of the disclosure.

Referring now to FIG. 9, showing a block diagram of a system for determining the queue size for one or more buffers, in accordance with some exemplary embodiments of the disclosure.

The block diagram of FIG. 9 may be configured to execute the methods of FIGS. 5-8 above. The system of FIG. 9 may comprise one or more computing platforms 900. While FIG. 9 shows a single computing platform, it will be appreciated that the methods may be executed by different computing platforms, each comprising one or more of the components detailed below. Thus, the computing platform of FIG. 9 may be implemented as one or more computing platforms which may be operatively connected, or wherein data may be provided directly or indirectly from one computing platform to the other. For example, one computing platform 900 may be a part of an access switch, an aggregate switch or a core switch of a data center and may execute the method of FIG. 6, while another computing platform 900 may be a remote computing platform, such as a server, a desktop computer, a laptop computer, or the like, and may execute the method of FIG. 5.

Computing platform 900 may communicate with other computing platforms via any communication channel, such as a Wide Area Network, a Local Area Network, intranet, Internet, transfer of memory storage device, or the like.

Computing platform 900 may comprise a processor 904 which may be one or more Central Processing Units (CPU), a microprocessor, an electronic circuit, an Integrated Circuit (IC) or the like. Processor 904 may be configured to provide the required functionality, for example by loading to memory and activating the modules stored on storage device 916 detailed below. It will be appreciated that processor 904 may be implemented as one or more processors, whether located on the same platform or not.

Computing platform 900 may comprise Input/Output (I/O) device 908 such as a display, a speakerphone, a headset, a pointing device, a keyboard, a touch screen, or the like. I/O device 908 may be utilized to receive input from and provide output to a user, for example receive preferences, display performance statistics, or the like.

Computing Platform 900 may comprise a communication device 912, for communicating with other computing platforms, such as other switches, servers, PoDs, data centers, or the like. Communication device 912 may be adapted to communicate by any communication protocol and over any channel, such as the Internet, Intranet. LAN, WAN, or others.

Computing Platform 900 may comprise a storage device 916, such as a hard disk drive, a Flash disk, a Random Access Memory (RAM), a memory chip, or the like. In some exemplary embodiments, storage device 916 may retain program code operative to cause processor 904 to perform acts associated with any of the modules listed below, or steps of the methods of FIG. 5 and FIG. 6 above. The program code may comprise one or more executable units, such as functions, libraries, standalone programs or the like, adapted to execute instructions as detailed below.

Storage device 916 may comprise feature extraction component 920 for extracting features from a single traffic unit, such as a packet, or from a sequence of two or more such units. The features may be, for example, the source address, the destination address, the packet arrival rate, the time and date, the specific switch and the specific data center, priority level (for example, service level agreement or MapReduce would be of high priority). The packet arrival rate can be measured by the monitoring the optical power, for example by using the disclosure of PCT publication number WO2022/168074, titled "Device and Method for Calibration, Monitoring and Control of the Integrated Photonic Systems" and assigned to the same assignee as the present Application.

Storage device 916 may comprise clustering component 924, for receiving a plurality of feature vectors extracted from the traffic units, and clustering them into groups, also referred to as classes or clusters, such that feature vectors assigned to the same group are more similar to each other, according to a predetermined metrics, than feature vectors assigned to different groups.

Storage device 916 may comprise classifier component 928, for receiving one or more feature vectors, for example as extracted by feature extraction component 920, and classifying them into the classes or clusters created by clustering component 924.

Storage device 916 may comprise prediction engine training component 932, for receiving for each such class the relevant feature vectors, and one or more ground truth values, such as $Np(t, t+\tau, location)$, $B_{oc}(t, t+\tau, location)$ and $\gamma^i_c(t, t+\tau, location)$ for a variety of $\tau$ and location vectors. After training, each such trained engine is configured to receive as input a feature vector, possibly a $\tau$ and location values, and output the relevant $Np(t, t+\tau, location)$, $B_{oc}(t, t+\tau, location)$ and $\gamma^i_c(t, t+\tau, location)$. In some embodiments, the engine may not receive the $\tau$ value, but rather output a set of $Np(t, t+\tau, location)$, $B_{oc}(t, t+\tau, location)$ and $\gamma^i_c(t, t+\tau, location)$ values for each of a few values of $\tau$, or a specific $\tau$ value and the associated values which provide a preferred combination. The training engine may partition the available feature vectors into training, verification and testing vectors. The trained engines may be neural networks, deep neural networks, Recurrent Neural Network (RNN), Long-Short Term memory, or any other artificial intelligence engine.

Gated recurrent units (GRUs) are a gating mechanism in RNN. In some embodiments, GRUs may be used for enhancing the performance. The Usage of GRUs is further detailed in "Recurrent Neural Networks: building GRU cells VS LSTM cells in Pytorch" by Ikolas Adaloglou published on Sep. 17, 2020 at https://theaisummer.com/gru, on "Evolution: from vanilla RNN to GRU & LSTMs" published on Aug. 21, 2017 and available at https://towardsdatascience-.com/lecture-evolution-from-vanilla-rnn-to-gru-lstms-58688f1da83a and the associated slide show, available at: https://docs.google.com/presentation/d/1UHXrKLloTdgMLoAHHPfMM_srDO0BCyJXPmhe4DNh_G8/pub?start=false&loop=false&delayms=3000&slide=id.g24de73a70b 0_0, all incorporated by reference in their entirety and for any purpose. It is contemplated that the read and forget gates in the GRU depend on the traffic at the specific time and location.

Storage device 916 may comprise emulator system 936 which may emulate the operation of the operative system at least in terms of calculating and applying buffer sizes, such that the performance may be evaluated, for example determining whether congestion was eliminated, whether the throughput has improved, whether the number of high priority packets lost and the total number of lost packets has decreased, transition duration between the previous state with the previous thresholds and the new state with updated threshold has decreased, or the like.

Storage device 916 may comprise feedback analysis engine 940, for receiving feedback about the performance when new thresholds are applied, whether to the operative system as in the method of FIG. 7, or to an emulator system, as in the method of FIG. 8. Feedback analysis engine 940 may collect the feedbacks, and determine applicable rewards or penalties for the engines, which may be considered during activation of the engines and in future training sessions.

Storage device 916 may comprise control and data flow component 944 for managing the flow, such that each of the components detailed above receives the expected input and its output is directed to its destination, and the required calculations are performed. For example, control flow component 944 may receive the traffic units, activate feature extraction component 920 for extracting features, classify the features, activate the relevant engine for the class, compute the applicable values based for example on current values and predicted values, and provide the values for allocation of the buffers.

Storage device 916 may comprise engines 948 as trained by classifier training component 928 and prediction engine training component 932, and used for classifying further feature vectors and predicting the required values.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, such as "C", C#, C++, Java, Phyton, Smalltalk, or others. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing traffic in a communication network, comprising:
   receiving a plurality of traffic units to be transmitted by a switch through a port, the port having an associated queue, the switch located in a data center;
   extracting features from the plurality of traffic units;
   providing the features to a first engine, to obtain a class for the plurality of traffic units;
   using a second engine associated with a traffic model for the class, obtaining an indication of a predicted traffic volume for the class for a future time and for a physical location of the switch that transmits the plurality of traffic units;
   allocating a queue of a size corresponding to the indication of the predicted traffic volume;
   assigning the plurality of traffic units to the queue;
   determining whether performance of the communication network has improved or deteriorated; and
   subject to deterioration of the performance
   generating a penalty;
   accumulating generated penalties to obtain an accumulated penalty;
   in response to the accumulated penalty exceeding a threshold, triggering retraining of the first engine for improving obtaining the class for the plurality of traffic units, and of the second engine for improving obtaining the indication of the predicted traffic volume for the class, for the future time.

2. The method of claim 1, further comprising generating a reward subject to improvement of the performance, wherein retraining the first engine or the second engine is performed also in accordance with the reward.

3. The method of claim 1, wherein determining whether the performance of the communication network has improved or deteriorated is based on at least one item selected from the group consisting of: throughput, whether congestions occurred, number of high priority packets lost, total number of lost packets, and transition duration between a previous state with previous thresholds and a new state with updated threshold.

4. The method of claim 1, wherein a traffic unit of the plurality of traffic units is a packet.

5. The method of claim 1, further comprising:
   receiving a preliminary plurality of traffic units to be transmitted;
   extracting features from each of the preliminary plurality of traffic units to obtain a plurality of feature vectors;
   clustering the plurality of feature vectors into a plurality of classes; and
   training the first engine to receive the plurality of traffic units and output the class from the plurality of classes.

6. The method of claim 5, further comprising:
   training the second engine upon a subset of the plurality of feature vectors assigned to a specific class, such that the second engine is adapted to provide the indication for the predicted traffic volume for the class, according to the traffic model.

7. The method of claim 1, wherein
   the predicted traffic volume is predicted for the future time t+τ, and wherein
   t is a current time and τ is a time interval, and wherein
   the traffic volume is predicted based upon at least one item selected from the group consisting of: an available buffer size at a current time and at the future time; a number of congested queues of a first priority of the class at the future time; a normalized dequeue rate of the queue associated with the port at the future time; a second priority of an application or site associated with the plurality of traffic units; a coefficient associated with the class; and a physical location of the switch.

8. The method of claim 1, wherein the predicted traffic volume is predicted in accordance with a following formula:

$$T_c^i(t, t + \tau, \text{location}) = \alpha_c \cdot 1/Np'(t, t + \tau, \text{location}) \cdot \gamma f'(t, t + \tau, \text{location}) \cdot (B - Boc'(t, t + \tau, \text{location}))$$

wherein:
i is an index of the port;
c is the class of the plurality of traffic units;
t is a current time;
τ is a time difference to the future time;
$\alpha_c$ is a coefficient assigned to class c;
Location is the physical location of the switch within the data center;
Np'(t, t+τ, location) is a variation or combination of:
   Np(t, location) being a number of congested queues of a priority of the class at time t for the switch, and
   Np(t+τ, location) being the number of congested queues of priority p of the class at time t+τ for the switch;
B−$B_{oc}$'(t, t+τ, location) is a variation or combination of:
   B−$B_{oc}$(t, location) being a remaining buffer at time t for the switch, and
   B−$B_{oc}$(t+τ, location) being a remaining buffer at time t+τ for the switch; and $\gamma_c^i{}'(t, t+\tau, \text{location})$ is a variation or combination of:

$\gamma_c^i(t, \text{location})$ being a per-port-normalized dequeue rate of the queue of class c at time t for the switch, and $\gamma_c^i(t+\tau, \text{location})$ being the per-port-normalized dequeue rate of the $i^{th}$ queue of class c at time t+τ for the switch.

9. The method of claim 1, wherein the queue is not emptied in a first-in-first-out manner.

10. The method of claim 1, wherein multiple traffic units are dequeued simultaneously from the queue.

11. A method for managing traffic in a communication network, comprising:
  receiving a plurality of traffic units to be transmitted by a switch through a port, the port having an associated queue, the switch located in a data center;
  extracting features from the plurality of traffic units;
  providing the features to a first engine, to obtain a class for the plurality of traffic units;
  using a second engine associated with a traffic model for the class, obtaining an indication of a predicted traffic volume for the class for a future time and for a physical location of the switch that transmits the plurality of traffic units;
  operating an emulator system with a queue of a size corresponding to the indication of the predicted traffic volume;
  determining performance of the emulator system;
  subject to the performance improving over past performance of the communication network:
    allocating the queue associated with the port with a size corresponding to the indication of the predicted traffic volume; and
    operating the communication network with the queue; and
  subject to the performance of the emulator not improving over past performance of the communication network:
    triggering retraining of at least one of the classification engine or the prediction engine and re-operating the emulator system.

12. The method of claim 11, wherein the traffic unit is a packet.

13. The method of claim 11, further comprising:
  receiving a preliminary plurality of traffic units to be transmitted;
  extracting features from each of the preliminary plurality of traffic units to obtain a plurality of feature vectors;
  clustering the plurality of feature vectors into a plurality of classes; and
  training the first engine to receive the plurality of traffic units and output the class from the plurality of classes.

14. The method of claim 11, further comprising:
  training the second engine upon a subset of the plurality of feature vectors assigned to a specific class, such that the second engine is adapted to provide the indication for the predicted traffic volume for the class, according to the traffic model.

15. The method of claim 11, wherein the predicted traffic volume is predicted for a future time t+τ wherein t is a current time and τ is a time interval, and wherein the traffic volume is predicted based upon at least one item selected from the group consisting of: an available buffer size at a current time and at the future time, a number of congested queues of a first priority of the class at the future time; a normalized dequeue rate of the queue at the future time;

a second priority of an application or site associated with the plurality of traffic units; a coefficient associated with the class; and a physical location of the switch.

16. The method of claim 11, wherein the predicted traffic volume is predicted in accordance with a following formula:

$$T_c^i(t, t+\tau, \text{location}) = \alpha_c \cdot 1/Np'(t, t+\tau, \text{location}) \cdot$$
$$\gamma f'(t, t+\tau, \text{location}) \cdot (B - Boc'(t, t+\tau, \text{location}))$$

wherein:
  i is an index of the port;
  c is the class of the plurality of traffic units;
  t is a current time;
  τ is a time difference to a future time;
  $\alpha_c$ is a coefficient assigned to class c;
  Location is the physical location of the switch within the data center;
  Np'(t, t+τ, location) is a variation or combination of:
    Np(t, location) being a number of congested queues of a priority of the class at time t for the switch, and
    Np(t+τ, location) being the number of congested queues of priority p of the class at time t+τ for the switch;
  $B-B_{oc}'(t, t+\tau, \text{location})$ is a variation or combination of:
    $B-B_{oc}(t, \text{location})$ being a remaining buffer at time t for the switch, and
    $B-B_{oc}(t+\tau, \text{location})$ being a remaining buffer at time t+τ for the switch; and
  $\gamma_c'(t, t+\tau, \text{location})$ is a variation or combination of:
    $\gamma_c(t, \text{location})$ being a per-port-normalized dequeue rate of the queue of class c at time t for the switch, and
    $\gamma_c(t+\tau, \text{location})$ being the per-port-normalized dequeue rate of the $i^{th}$ queue of class c at time t+τ for the switch.

17. The method of claim 11, wherein the queue is not emptied in a first-in-first-out manner.

18. The method of claim 11, wherein multiple traffic units are dequeued simultaneously from the queue.

19. A computer program product comprising a non-transient computer readable storage medium retaining program instructions, which program instructions when read by a processor, cause the processor to perform:
  receiving a plurality of traffic units to be transmitted by a switch through a port, the port having an associated queue, the switch located in a data center;
  extracting features from the plurality of traffic units;
  providing the features to a first engine, to obtain a class for the plurality of traffic units;
  using a second engine associated with a traffic model for the class, obtaining an indication of a predicted traffic volume for the class for a future time and for a physical location of the switch that transmits the plurality of traffic units;
  allocating a queue of a size corresponding to the indication of the predicted traffic volume;
  assigning the plurality of traffic units to the queue;
  determining whether performance of the communication network has improved or deteriorated; and
  subject to deterioration of the performance:
    generating a penalty; and
    retraining, in accordance with the penalty, the first engine for improving obtaining the class for the plurality of traffic units, and of the second engine for improving obtaining the indication of the predicted traffic volume for the class, for the future time.

20. A computer program product comprising a non-transient computer readable storage medium retaining program instructions, which program instructions when read by a processor, cause the processor to perform:
   receiving a plurality of traffic units to be transmitted by a switch through a port, the port having an associated queue, the switch located in a data center;
   extracting features from the plurality of traffic units;
   providing the features to a first engine, to obtain a class for the plurality of traffic units;
   using a second engine associated with a traffic model for the class, obtaining an indication of a predicted traffic volume for the class for a future time and for a physical location of the switch that transmits the plurality of traffic units;
   operating an emulator system with a queue of a size corresponding to the indication of the predicted traffic volume;
   determining performance of the emulator system;
   subject to the performance improving over the past performance of the communication network, allocating the queue associated with the port with a size corresponding to the indication of the predicted traffic volume; and
   operating the communication network with the queue.

* * * * *